United States Patent
Yost et al.

(10) Patent No.: US 6,691,437 B1
(45) Date of Patent: Feb. 17, 2004

(54) LASER REFERENCE SYSTEM FOR EXCAVATING MACHINE

(75) Inventors: Jerald W. Yost, Casstown, OH (US); Richard M. Pope, Jr., Tipp City, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 10/395,326

(22) Filed: Mar. 24, 2003

(51) Int. Cl.⁷ .................................................. G05D 1/02
(52) U.S. Cl. ........................ 37/348; 356/141.2; 356/72; 356/912; 414/698; 414/699; 701/50
(58) Field of Search ................................ 701/50; 172/4, 172/2, 4.5; 37/348, 382; 356/141.1, 141.2, 141.3, 72, 912; 414/698, 699

(56) References Cited

U.S. PATENT DOCUMENTS

| | | | |
|---|---|---|---|
| 3,997,071 A | 12/1976 | Teach | |
| 4,069,591 A * | 1/1978 | McArthur | ..................... 33/312 |
| 4,231,700 A * | 11/1980 | Studebaker | ................. 414/700 |
| 4,393,606 A * | 7/1983 | Warnecke | .................... 172/430 |
| 4,491,927 A | 1/1985 | Bachmann et al. | |
| 4,888,890 A * | 12/1989 | Studebaker et al. | .......... 37/103 |
| 5,848,485 A | 12/1998 | Anderson et al. | |
| 6,263,595 B1 * | 7/2001 | Ake | ............................ 37/348 |
| 6,336,077 B1 | 1/2002 | Boucher | |

* cited by examiner

Primary Examiner—Christopher J. Novosad
(74) Attorney, Agent, or Firm—Dinsmore & Shohl LLP

(57) ABSTRACT

A level sensing system for use with an excavating machine includes a light receiving sensor, mounted on the dipper stick of the machine, and an inclinometer, also mounted on the dipper stick of the machine. The sensor and inclinometer provide indications of the relative location of a beam of light and the inclination of the dipper stick. The inclinometer includes a gyroscopic inclination sensor and an accelerometer arrangement for sensing acceleration due to gravity and providing a static vertical reference. A position determining circuit is responsive to the sensor and the inclinometer and calculates the position of a pivot joint on the dipper stick to which a digging bucket is attached. The beam of light is a beam of laser light which is projected by a laser transmitter. An angle-measuring sensor may be provided for measuring the angular orientation between the dipper stick and a cutting edge of the bucket.

9 Claims, 4 Drawing Sheets

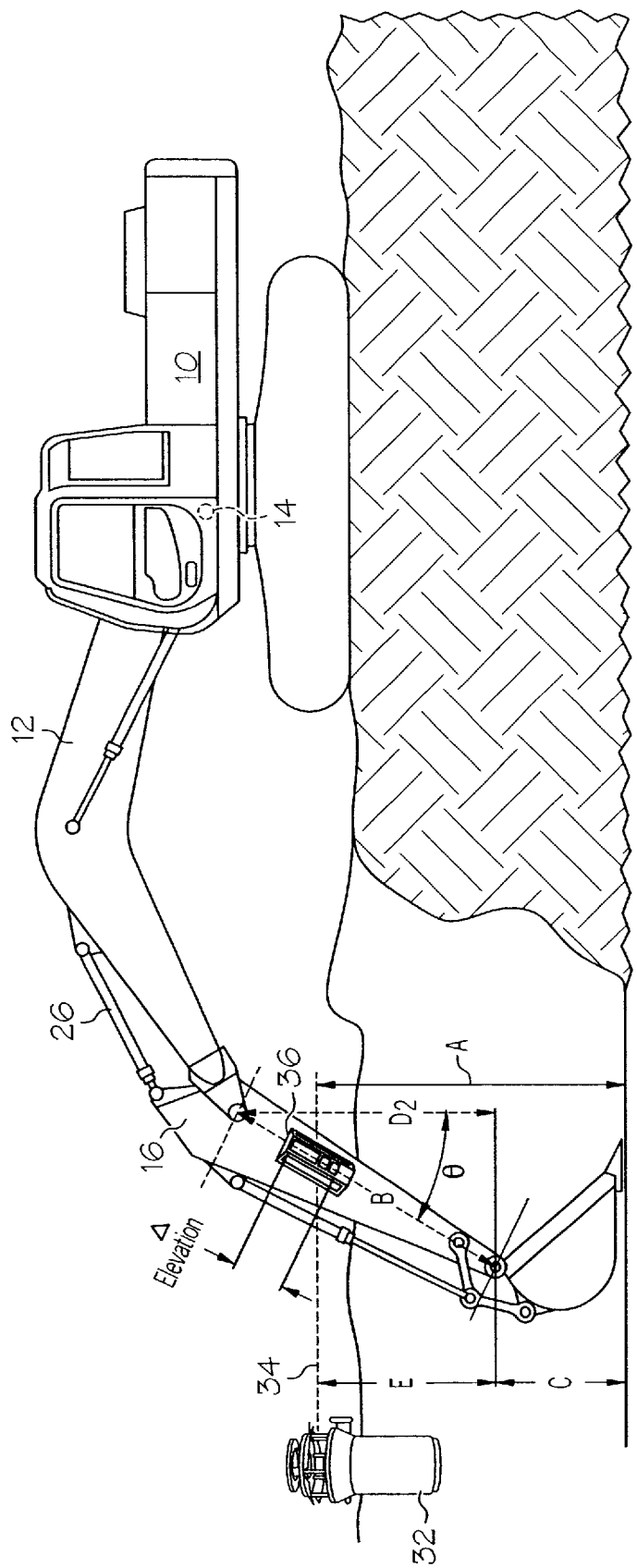

LASER REFERENCE SYSTEM FOR EXCAVATING MACHINE

CROSS-REFERENCE TO RELATED APPLICATIONS

None

STATEMENT REGARDING FEDERALLY SPONSORED RESEARCH OR DEVELOPMENT

Not Applicable

BACKGROUND OF THE INVENTION

The present invention relates generally to a level sensing system for use with an excavating machine in which a laser light beam provides a reference and, more particularly, to such a level sensing system arranged to assist the operator of the excavating machine in digging at a defined depth.

Use of laser reference systems for measurement and for machine control has become common in the construction industry. For example, a laser transmitter at a construction site is used to project a beam of laser light. The transmitter is designed to rotate the beam rapidly about a vertical axis. The rotating beam may be detected by laser beam receivers as a part of the process of surveying the construction site. The rotating beam defines a reference plane of light that can also be sensed by sensors mounted on various excavating machines and used to control the operation of those machines. The term excavating machines will be used herein to refer to equipment for performing digging operations, including for example graders, scrapers, trenchers, backhoes and excavators. Due to their similar structures (i.e., an outreach boom, pivotally connected to the machine chassis, a down reaching boom or dipper stick, pivotally connected to the distal end of the outreach boom, and a bucket pivotally connected to the distal end of the dipper stick), the digging stroke of such an excavating machine involves an arcuate movement of the dipper stick.

It will be appreciated that it will be difficult for a machine operator to use an excavating machine of this type to dig an area having a flat excavation surface. Further, digging to a desired depth over a larger area is also difficult with such an excavating machine and may require frequent measurement and adjustment in the depth of the excavation.

One approach to applying laser control to an excavating machine, for example a backhoe, is disclosed in U.S. Pat. No. 4,231,700, issued Nov. 4, 1980, to Studebaker. The Studebaker system does not attempt to limit movement of the bucket to a planar stroke. Rather, the disclosed apparatus includes a beam detector, mounted on a down reach boom, which is kept in a fixed relationship with respect to a reference plane defined by a rotating laser beam. Although the detector is maintained at a fixed height, the cutting edge of the backhoe falls and rises during the digging stroke due to the pivoting action of the down reach boom. Thus, the bottom of a trench which is dug utilizing this system will not be completely flat.

U.S. Pat. No. 4,393,606, issued Jul. 19, 1983, to Warnecke shows an excavator having a sensor supported by a mast which is mounted on the upper part of the bucket. A disadvantage of the Warnecke system is that in an excavation of any depth, the laser source must be placed in the excavation. This makes the Warneke system readily susceptible to damage during the normal course of an excavation.

U.S. Pat. No. 4,888,890, issued Dec. 26, 1989, to Studebaker et al shows an excavator system in which the laser detector is supported on a mast that is held vertical by a counterweight. The mast is mounted at the pivotal connection between the outreach boom and the dipper stick, and the angular orientation of the dipper stick is determined by an inclinometer. Based on the detected vertical location of the laser beam and on the angular orientation of the dipper stick it is possible to calculate the vertical position of the bottom of the dipper stick and the bucket which it carries. Similarly, U.S. Pat. No. 6,263,595, issued Jul. 24, 2001, to Ake discloses a laser system for an excavator in which, in one embodiment, the dipper stick carries both a laser beam receiver and an inclinometer. The difficulty with an arrangement incorporating an inclinometer as shown in the Studebaker et al and Ake is that it is sensitive to vibration and motion induced errors. Essentially, in order to obtain an accurate reading of inclination, movement of the dipper stick must be temporarily stopped. Such an arrangement hampers operation of the excavator to an unacceptable degree.

It is seen therefore that there is a need for a simple level sensing system for use with an excavating machine in which accurate measurements may be made during operation of the machine without motion induced error.

SUMMARY OF THE INVENTION

This need is met by the present invention by providing a method and apparatus for controlling the working depth of a bucket of an excavating machine in response to a beam of laser light which is projected at a reference height. The level sensing system is used with an excavating machine of the type having a chassis, a boom pivotally secured to the chassis at a first pivot joint, a dipper stick pivotally secured to the boom at a second pivot joint, and a bucket pivotally secured to the dipper stick at a third pivot joint. The level sensing system includes a light receiving sensor, an inclinometer, and a position determining circuit. The light receiving sensor is mounted on the dipper stick and provides an indication of the relative location of a beam of light striking the light receiving sensor. The inclinometer is mounted on the dipper stick and provides an indication of the inclination of the dipper stick. The inclinometer includes a gyroscopic inclination sensor and an accelerometer arrangement for sensing acceleration due to gravity and providing a static vertical reference. The position determining circuit is responsive to the sensor and the inclinometer and calculates the position of the third pivot joint based on the inclination of the dipper stick and on the relative location of the beam of light striking the light receiving sensor.

The beam of light may be a beam of laser light which is projected by a laser transmitter and rotated to define a reference plane of laser light. The light receiving sensor may comprise an elongated photocell structure that is responsive to laser light and that provides a linear indication of the relative location of the beam to the position determining circuit.

The level sensing system may further comprise at least one angle-measuring sensor for measuring the angular orientation between the dipstick and a cutting edge of the bucket. The angle-measuring sensor provides an indication of the angular orientation to the position determining circuit, permitting the circuit to determine the location of the cutting edge of the bucket.

A level sensing system for use on a digging machine includes a light receiving sensor, mounted on a machine element, and providing an indication of the location of reference light striking the sensor. The location is a predetermined distance above a digging elevation. The light receiving sensor includes an elongated photocell arrangement. The system has a gyroscopic inclinometer mounted on the machine element. The inclinometer has at least one accelerometer that compensates for long term drift. Finally, the system has a circuit for calculating the position of a point on the machine element based on the location of the light striking the sensor and on the inclination of the machine element, as indicated by the inclinometer. The digging may be effected at the digging elevation by means of a digging element secured to the machine element at the point.

The machine element may typically be a dipper stick. The digging element may be a bucket that is pivotally mounted at the point on the dipper stick. An angle-measuring sensor provides an indication of the angle between the dipper stick and the bucket. The circuit is responsive to the angle-measuring sensor for determining the location of a cutting edge of the bucket.

Accordingly, it is an object of the present invention to provide a level sensing system for use with an excavator machine in which senses a reference plane of laser light and the angular orientation of a dipper stick to determine the vertical position of a the cutting edge of a bucket; to such a system in which an angular measurement is made between the dipper stick and the bucket; and to such a system in which the orientation is determined by a gyroscopic inclinometer including an accelerometer to correct for long term drift.

Other objects and advantages of the invention will be apparent from the following description, the accompanying drawings and the appended claims.

BRIEF DESCRIPTION OF THE DRAWINGS

FIG. 2 is a diagrammatic view of the level sensing system of the present invention, illustrating the elements of the system in a different relative position;

DETAILED DESCRIPTION OF THE PREFERRED EMBODIMENT

Figure 1:
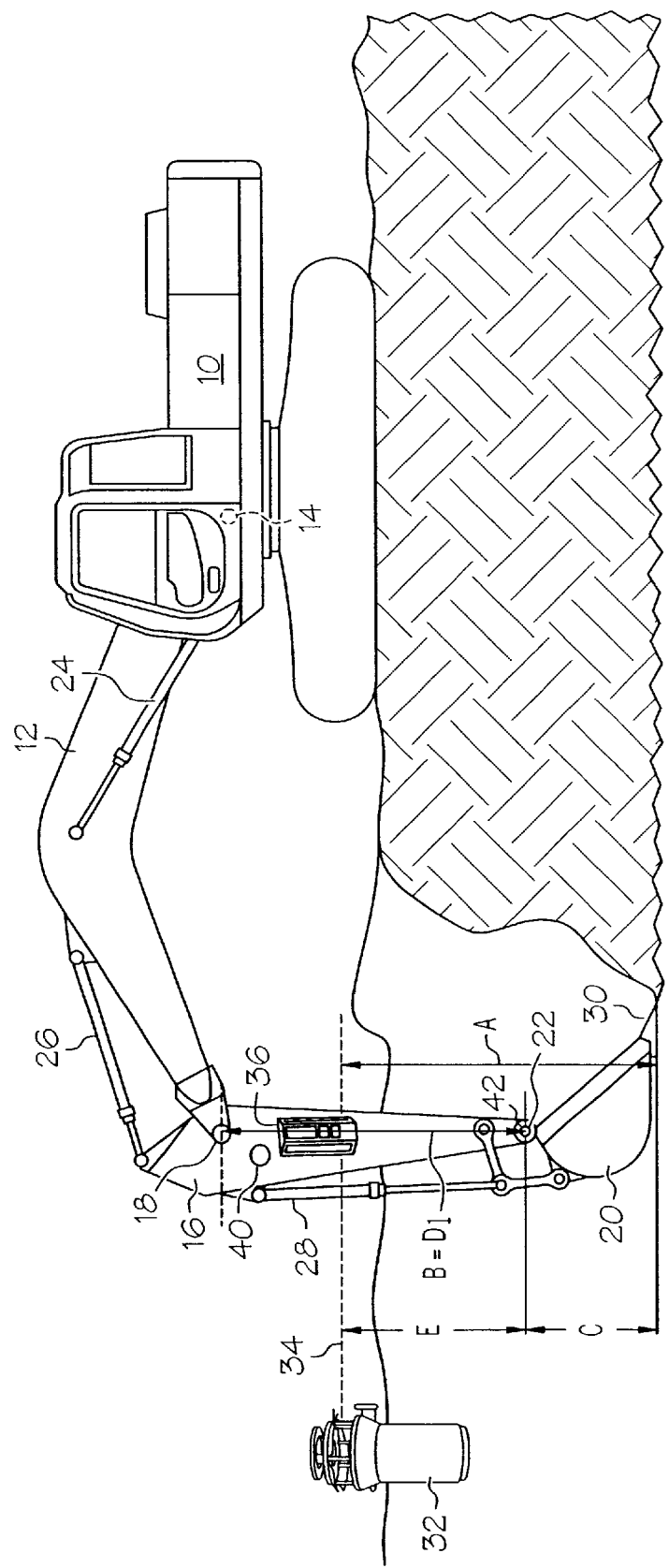
FIG. 1 is a diagrammatic view of the level sensing system of the present invention, illustrating the manner in which said system operates.

Reference is made to FIG. 1 of the drawings which illustrates a level sensing system for use with an excavating machine according to the present invention. The excavating machine includes a chassis 10, a boom 12 pivotally secured to the chassis 10 at a first pivot joint 14, a dipper stick 16 pivotally secured to the boom 12 at a second pivot joint 18, and a bucket 20 pivotally secured to the dipper stick 16 at a third pivot joint 22. Hydraulic cylinders 24, 26, and 28 may be actuated to effect the relative movement of boom 12, dipper stick 16 and bucket 20, respectively. Bucket 20 includes a cutting edge 30 which may have serrated teeth (not shown).

A laser transmitter 32 projects a beam of laser light, diagrammatically indicated at 34. The transmitter 32 will typically be supported on a tripod or other stationary support (not shown) at the construction site such that it can project the beam of light 34 continuously for reference. The transmitter 32 rotates the beam 34 about a generally vertical axis to define a reference plane of laser light which can be received at virtually all points throughout the construction site. A light receiving sensor 36 is mounted on the dipper stick 16 to provide an indication of the relative location of the beam of light 34 striking the light receiving sensor, and therefore the relative location of the beam of light 34 with respect to the dipper stick 16.

The invention further includes an inclinometer 40, mounted on the dipper stick 16 and providing an indication of the inclination of the dipper stick 16. The inclinometer 16 includes a gyroscopic inclination sensor and an accelerometer arrangement, discussed below in conjunction with FIGS. 5 and 6, for sensing acceleration due to gravity and providing a static vertical reference. An inclinometer such as the FAS-G Inclinometer, available from Microstrain, Inc., of Burlington, Vermont, may be used in this application.

Finally, the level sensing system may include a position determining circuit (FIG. 5), responsive to the sensor 36 and the inclinometer 40, for calculating the position of the third pivot joint 22 based on the inclination of the dipper stick 16 and on the relative location of the beam of light 34 striking the light receiving sensor 36. The circuit of FIG. 5 accomplishes this task through the straightforward application of trigonometric relationships. FIG. I shows the excavator with the dipper stick 16 in essentially a vertical position. Dimension A is the distance from the desired grade to the laser beam 34. Dimension E is the distance from the dipper-bucket joint 22 to the laser beam. Dimension $D_1$ is the vertical component of Dimension B. When the dipper stick 16 is vertical, $D_1$ is equal to B. Dimension C is the vertical distance from the cutting edge to the dipper-bucket joint 22. This distance is assumed to be constant as the dipper stick 16 swings through its digging arc. FIG. 2 shows the dipper stick 16 in its outer digging position. The dimensions are the same as the ones shown in FIG. 1, with the exception of D. Dimension $D_2$ is now equal to Bcosθ.

Figure 4:
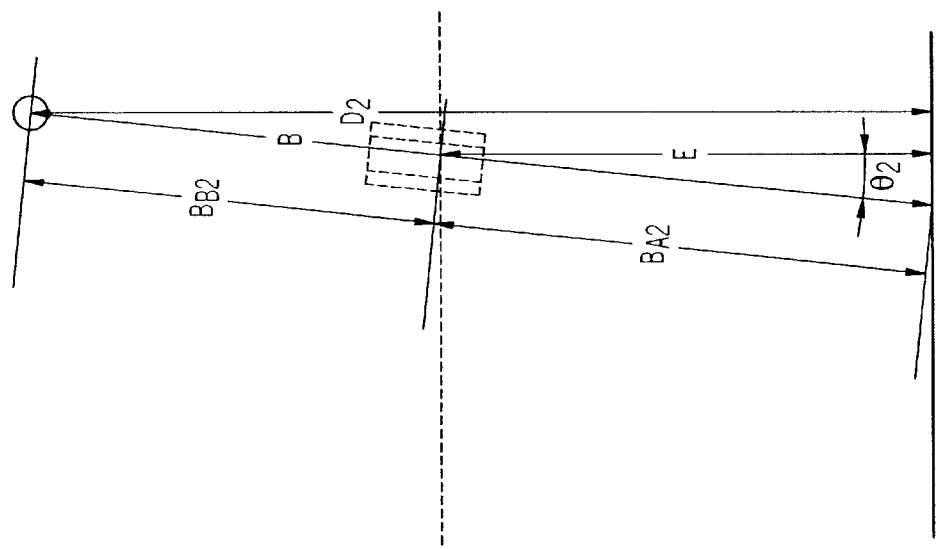
FIG. 4 is a view illustrating geometric variables associated with the operation of the present invention
Figure 3:
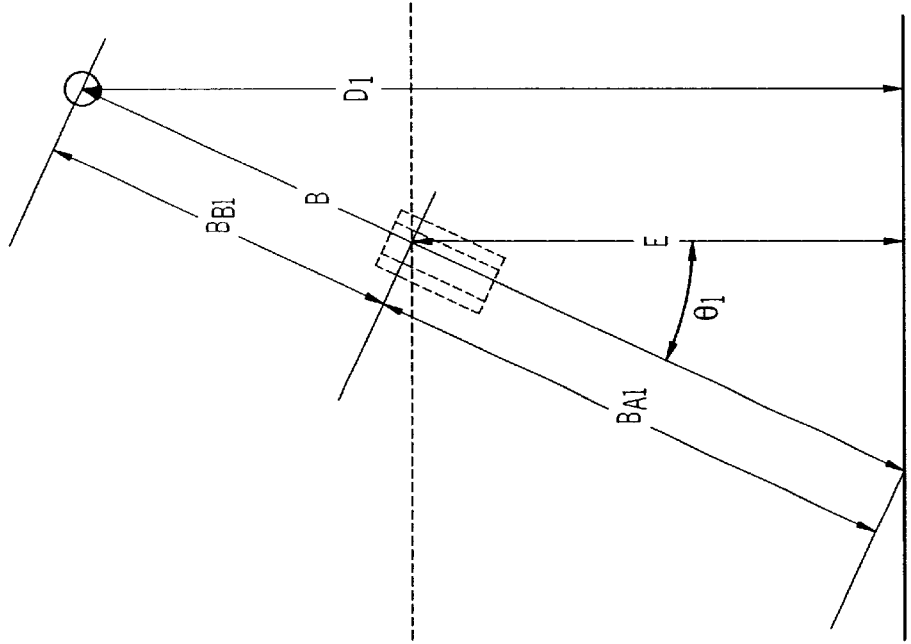
FIG. 3 is a view illustrating geometric variables associated with the operation of the present invention

FIG. 3 shows the dimensional arrangement for the first position of the dipper stick in greater detail. $B_{A1}$ is the distance from the joint 22 to the intersection point of the detector 36 and the beam 34. $θ_1$ is the dipper stick angle. $B_{A1}$ is equal to $Ecosθ_1$. FIG. 4 shows the dipper stick 16 in a more vertical position. The key changed parameters are $θ_2$ and $B_{A2}$. Similarly, $B_{A2}$ is equal to $Ecosθ_2$. The detector 36 on-grade change between these two positions is $B_{A2}-B_{A1}$, or $E(cosθ_2-cosθ_1)$. This equation assumes that the dimension E is known by the system. This could be measured and input into the receiver angle sensor system. It is also possible that the machine could "calibrate" this dimension into the receiver. This would be done by telling the system that it is in a "dimension learning" mode and then by placing the bucket at two different locations on a known level grade. E could then be calculated from the following: $(B_{A2}-B_{A1})/(cosθ_2-cosθ_1)$.

The light receiving sensor 36 comprises an elongated photocell structure responsive to laser light 34. The sensor 36 provides a linear indication to the position determining circuit of FIG. 5 of the relative location of the beam 34.

Optionally, system may further include an angle-measuring sensor, such as a shaft angle encoder 42 at joint 22. Encoder 42 measures the angular orientation between the dipper stick 16 and the cutting edge 30 of the bucket and provides an indication of this angular orientation to the position determining circuitry of FIGS. 5 and 6. As a result, the circuit determines the location of the cutting edge 30 of the bucket 20.

The inclinometer 40 includes a gyroscopic inclinometer arrangement that senses rapid changes in orientation of the dipper stick 16 and is generally unaffected by vibration and acceleration forces that are produced by such movement and vibration. It will be appreciated, however, that the use of only a gyroscopic inclinometer may result in an integration error producing a long term drift. In order to curtail such drift, an accelerometer arrangement, including at least two accelerometers, will zero out the inclinometer during periods when the dipper stick is not in motion. The accelerometers simply determine vertical by detecting acceleration due to gravity when the dipper stick is motionless. If desired, only a single accelerometer may be used if the acceleration is to be measured along a single axis.

Figure 5:
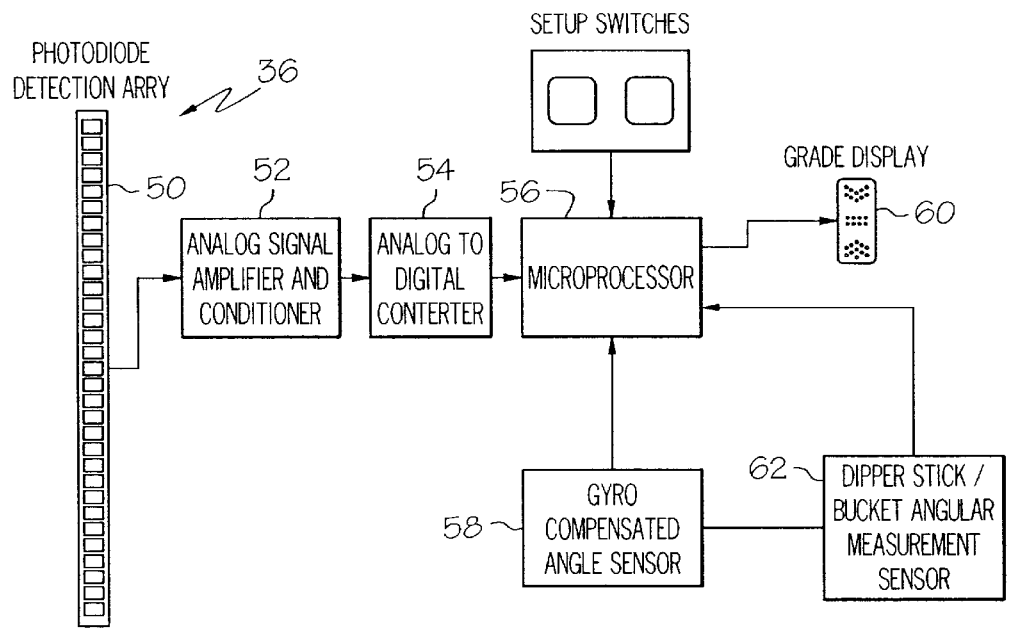
FIG. 5 is a schematic of the control circuit by which the present invention is controlled.
Figure 6:
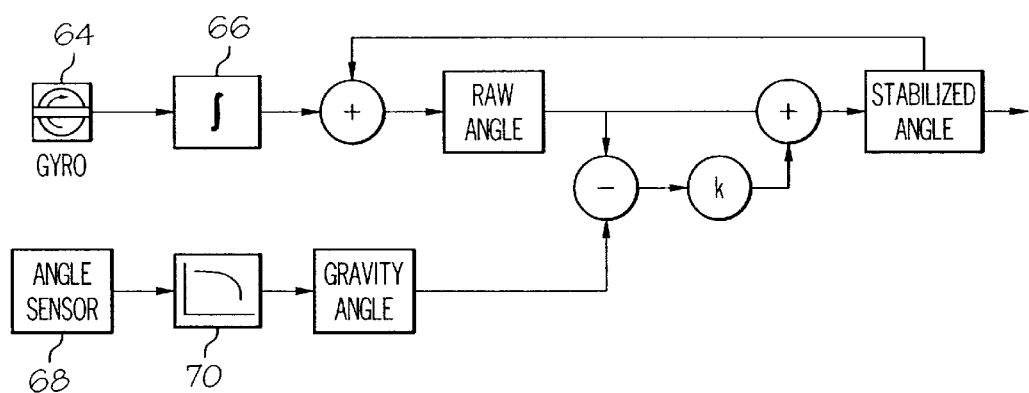
FIG. 6 is a schematic of a gyro-compensated angle sensor.

Reference is made to FIGS. 5 and 6 which show an electrical schematic diagram of the control circuit by which the present invention is controlled, and an electrical schematic diagram of a gyro-compensated angle sensor, respectively. The light receiving sensor 36 includes an elongated photocell arrangement shown as a photodiode detection array 50 which provides an indication of the location of the reference light striking the array. An analog signal amplifier and conditioner circuit 52 is responsive to the sensor 36, and provides an amplified signal to analog-to-digital converter 54. The digital output from converter 54 is then supplied to microprocessor 56 for calculating the position of a point on the machine element based on the location of the light striking the sensor 36 and on the inclination of the machine element as indicated by a gyro compensated angle sensor circuit 58. The microprocessor 56 then uses these to calculate a correct grade position to display on grade display 60. If desired, a dipper stick/bucket angular measurement sensor 62 may also provide a signal to the microprocessor 56 to permit the calculation of the position of a part of the bucket, such as the cutting edge 30 of the bucket 20.

FIG. 6 illustrates the dynamic pitch or gyro-enhanced angle sensor 58. The output of the gyroscope 64 is in the form of an angular rate that is integrated by circuit 66 which provides an angle signal. This angle signal is accurate for short periods of time but is subject to drift errors due to the integration of any noise in the system. The output of integrator 66 is then compared and adjusted by using the output from an angle sensor 68 which is supplied through a low pass filter 70. Angle sensor 68 is an accelerometer which senses the acceleration due to gravity and provides a static vertical reference. By this technique, the output of the gyroscopic inclinometer comprised of gyroscope 64 and integrator circuit 66 is compensated for long term drift.

Whereas particular embodiments of the invention have been described above for purposes of illustration, it will be appreciated by those skilled in the art that numerous variations of the details may be made without departing from the invention, as described in the appended claims.

What is claimed is:

1. A level sensing system for use with an excavating machine of the type having a chassis, a boom pivotally secured to said chassis at a first pivot joint, a dipper stick pivotally secured to said boom at a second pivot joint, and a bucket pivotally secured to said dipper stick at a third pivot joint, comprising:

a light receiving sensor, mounted on said dipper stick and providing an indication of the relative location of a beam of light striking said light receiving sensor, an inclinometer, mounted on said dipper stick and providing an indication of the inclination of said dipper stick, said inclinometer including a gyroscopic inclination sensor and an accelerometer arrangement for sensing acceleration due to gravity and providing a static vertical reference, and a position determining circuit, responsive to said sensor and said inclinometer, for calculating the position of said third pivot joint based on the inclination of said dipper stick and on the relative location of said beam of light striking said light receiving sensor.

2. The level sensing system as recited in claim 1, wherein said beam of light is a beam of laser light which is projected by a laser transmitter and rotated to define a reference plane of laser light, and wherein said light receiving sensor comprises an elongated photocell structure responsive to laser light and providing a linear indication of the relative location of said beam to said position determining circuit.

3. The level sensing system as recited in claim 2, further comprising: at least one angle-measuring sensor for measuring the angular orientation between said dipstick and a cutting edge of said bucket and providing an indication of said angular orientation to said position determining circuit, whereby the location of the cutting edge of the bucket may be determined.

4. A level sensing system for use on a digging machine, said system comprising:

a light receiving sensor, mounted on a machine element, providing an indication of the location of reference light striking said sensor, said location being a predetermined distance above a digging elevation, said light receiving sensor comprising an elongated photocell arrangement, a gyroscopic inclinometer, mounted on said machine element, including an accelerometer compensating for long term drift, and a circuit for calculating the position of a point on said machine element based on the location of the light striking the sensor and on the inclination of said machine element, as indicated by said inclinometer, whereby digging may be effected at said digging elevation by means of a digging element secured to said machine element at said point.

5. The level sensing system as recited in claim 4, wherein said machine element is a dipper stick, and wherein said digging element is a bucket, pivotally mounted at said point on said dipper stick.

6. The level sensing system as recited in claim 5, further comprising an angle-measuring sensor providing an indication of the angle between said dipper stick and said bucket, and wherein said circuit is responsive to said angle-measuring sensor for determining the location of a cutting edge of said bucket.

7. A level sensing system for use on an excavating machine of the type having a downwardly extending dipper stick, comprising: a light receiving sensor which provides an indication as to a location of a moving beam of light illuminating the light receiving sensor; and an angle-measuring sensor which provides an indication of an orientation of said dipper stick with respect to a gravity reference;

wherein said light receiving and angle measuring sensors provide distance information and orientation information, said distance information being the distance between the light-receiving sensor and a digging elevation, and the orientation information being the orientation of the dipper stick with respect to a vertical reference;

wherein said angle-measuring sensor includes a gyroscopic inclinometer having accelerometers for preventing drift; and wherein said moving beam of light comprises a rotating laser light beam, and said light receiving sensor comprises an elongated photocell arrangement responsive to laser light.

8. The level sensing system as recited in claim 7, in which a bucket is pivotally mounted at one end of said dipper stick, said bucket including a digging edge, and further comprising a second angle-measuring sensor responsive to an angle between said dipper stick and said bucket.

9. The level sensing system as recited in claim 7 in which said light receiving sensor is mounted for movement with said dipper stick.

\* \* \* \* \*